United States Patent [19]

Persson

[11] 4,277,778

[45] Jul. 7, 1981

[54] INFORMATION TRANSMITTING SYSTEM

[76] Inventor: Paul M. Persson, Flintvägen 20, S-175 61 Järfälla, Sweden

[21] Appl. No.: 968,855

[22] Filed: Dec. 12, 1978

Related U.S. Application Data

[63] Continuation-in-part of Ser. No. 794,412, May 6, 1977, abandoned.

[30] Foreign Application Priority Data

May 10, 1976 [SE] Sweden ............................... 7605253

[51] Int. Cl.³ .......................... H04B 1/00; H04Q 1/45
[52] U.S. Cl. .............................. 340/171 A; 178/17 C; 178/17.5
[58] Field of Search ........ 340/171 A, 171 PF, 171 R, 340/151, 152; 179/2 DP; 178/17.5, 17 C; 343/200, 225, 112 C; 364/423; 325/31, 53

[56] References Cited

U.S. PATENT DOCUMENTS

| 3,766,523 | 10/1973 | Brocker et al. ................. 340/171 R |
| 3,772,597 | 11/1973 | Stover .................................. 178/17 C |
| 3,866,178 | 2/1975 | Muller et al. ................... 340/171 PF |
| 3,909,818 | 9/1975 | Dalke et al. ..................... 340/152 R |
| 3,932,859 | 1/1976 | Kyriakides et al. ............. 340/152 R |
| 4,027,289 | 5/1977 | Toman ................................. 340/151 |
| 4,093,153 | 6/1978 | Bardash et al. ..................... 364/423 |

FOREIGN PATENT DOCUMENTS

| 990367 | 4/1965 | United Kingdom . |
| 1056820 | 2/1967 | United Kingdom . |
| 1115866 | 5/1968 | United Kingdom . |

Primary Examiner—Donald J. Yusko
Attorney, Agent, or Firm—Fleit & Jacobson

[57] ABSTRACT

A system for transmitting information from a plurality of observation stations to a central station, especially for military purposes. Every observation station is equipped with a coder and a code transmitter for selecting and transmitting code signs corresponding to the observations. Preferably the coder comprises a key set provided with a key for each kind of observation. The coded information from the different observation stations is transmitted on separated wave-lengths or channels and received in a central station and stored together with time information in a computer memory to be presented in assembled form whenever needed.

6 Claims, 5 Drawing Figures

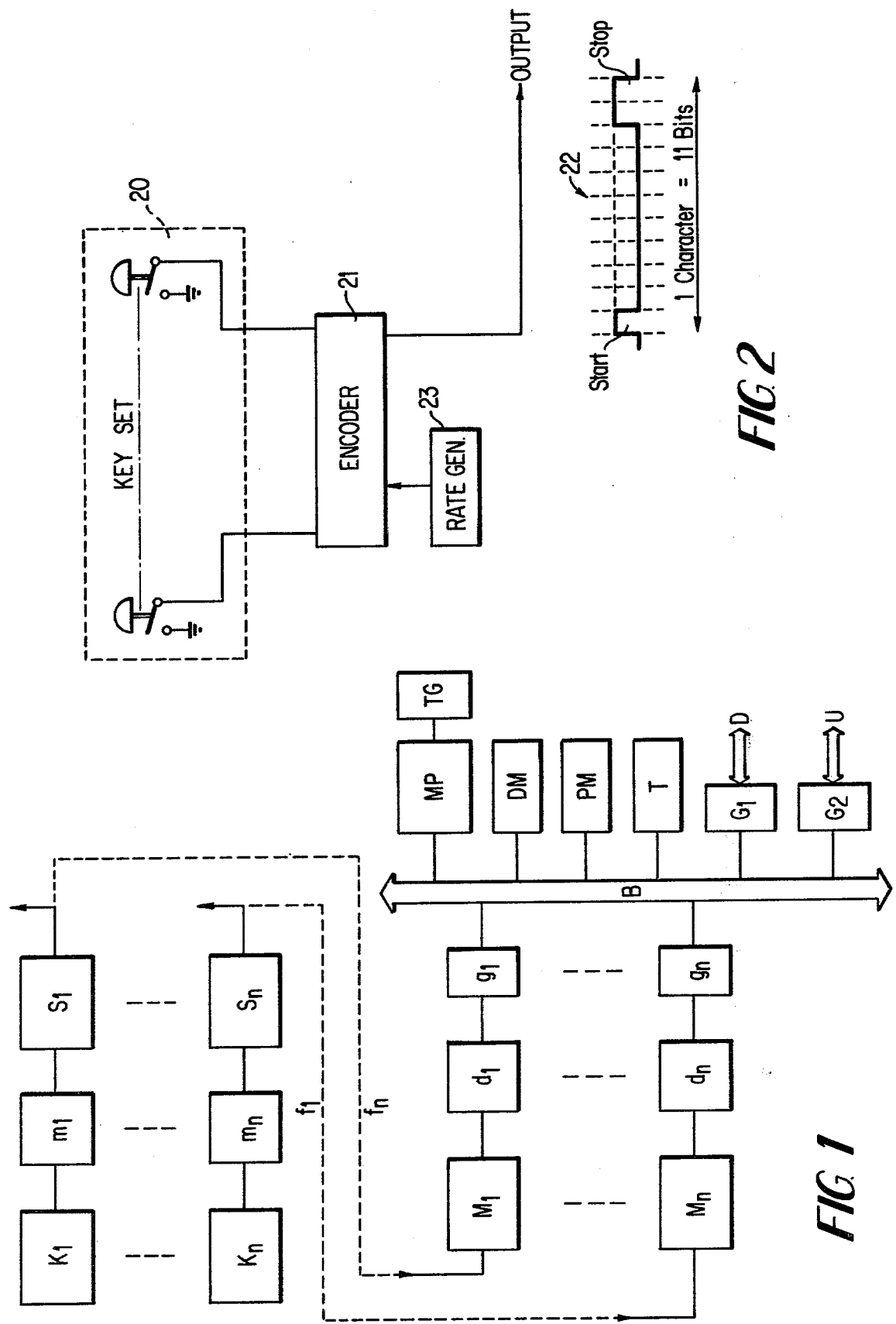

INFORMATION TRANSMITTING SYSTEM

CROSS-REFERENCE TO RELATED APPLICATION

This is a continuation-in-part of U.S. Ser. No. 794,412 filed on May 6, 1977, now abandoned.

GENERAL BACKGROUND

Imagine a number of operative units, which via communication radio are in connection with a guidance central. The operative units can be vehicles, airplanes or vessels giving reports concerning their positions, arrived activities etc. The reports constitute the base for the actions, which are ordered from the guidance central. In the guidance central must exist a "memory" about what has been reported, at least during a restricted time. This is usually effected by means of a sort of notations. It is however evident, that the problems in radio connections herewith are growing with the number of the operative units, which are to be guided from the guidance central.

For the operative units the problem is, to send the reports as quickly and uncomplicated as possible. It ought to be observed that reporting often must be done when "something happens" i.e. in a hurry.

BRIEF SUMMARY OF INVENTION

The present reporting system provide a solution of the proposed problems. In a few words the solution consists in that the conventional radio communication system, based on speech communication, is completed with further sets of apparatus, so that binary coded transferring can be effected of the latter type of information, which is decided to have such great importance that it during a limited time period must be stored in the guidance central, constituting part of basis for decisions. The reporting system is not a general system, but it must have such properties that it can be adapted to the type of information, which shall be transferred and treated or in other words according to what shall be "built in" in the system. The binary coded form gives the following advantages:

arrived reports can automatically be completed with the origin and time arrival, arrived reports can automatically be treated, for example be interpreted if it should be necessary, arrived reports can be temporary stored in an easy restorable way in order to get a surveyable presentation on a suitable medium, for example printer, table, screen.

When studying the behaviour of different units, for example certain artillery and guided missile units, tanks, aircraft etc, in a test battle situation, there are observers at or aboard the different operative units. The observers report verbally via a communication ratio transmitter to a central receiving station how the different occurrences or courses of events develop in the battle situation. The reporting may for example have reference to target discovery, target designation, fire, estimated hits etc. At the receiving station every operative unit is assigned to a separate channel in the recording medium at the station, a multichannel tape recorder. A common time-code is registered for all the channels. When the registering is finished, in most cases after several successive working periods have been covered, a listening is made in each channel and reports are drawn up, which together will form the basis for the evaluation of the test.

Owing to the manual manner of proceeding a long time may pass from the occurrence of a battle situation until an evaluated result is available. The question has therefore been put if an automatization of the information processing could be realized. The manner of proceeding can of course also be performed in connection with real battle situations.

It seems rather reasonable that the information, which is to be transmitted in a battle situation, can be structured in a relatively limited number of terms determined in advance. Consequently, the present invention is based on the use of a coded, preferably binary coded, transmission of information instead of a verbal transmission of information. Each of the observers are therefore equipped with an apparatus supplied with a key set. Every single key represents a determined information and is assigned to a special code. The coded information is preferably transmitted via the communication radio transmitter to the receiving station, where it will be registered (stored). The information is now present in such a form that it can directly be subjected to automatic data processing.

The characteristics of the system according to the present invention will appear in more detail from the detailed description, the drawings, and appended claims.

The amount of information during a working period, i.e., during a certain continuous course of events, is probably relatively limited, even in an enlarged system, and the processing, at least in a first stage, will be restricted to simple sorting and presentation, for which reason a computer of restricted size (minicomputer) connected on-line may be used.

The system ought to be realized by using mainly already existing standard units and commercially available components. The code for information transmission is for example the so-called Teletype code, which is commonly used in computer connections. The Teletype code is an extension of the ASCII code, which is standardized (ISO/R 648). The code comprises 64 (i.e. $2^6$) information carrying characters (letters, figures, signs), which gives an outer frame for the key set design. To the information carrying keys there is added a RUB-OUT-key, to be used when key errors are made. The keys may be provided with built-in lamps, which are lighted, when the key is depressed, or else a control display may be arranged on the apparatus, whereby the display shows, which keys have been depressed in a given observation situation.

The coded information from every depressed key is transmitted in series form. The speed of transmission is normally 10 signs/sec, i.e. 110 Baud. The transmission of the binary coded information will be done in a wireliss way on separated wave-lengths or channels for the different observation stations. The modulation is preferably effected by means of a subcarrier wave.

BRIEF DESCRIPTION OF DRAWINGS

An embodiment of a system according to the invention will now be described with reference to the accompanying drawings.

FIG. 1 is a block-diagram of the system of the present invention.

FIG. 2 is a diagram showing the key set connected to an encoder and shows, in a separate diagram the pulse signals generated by the encoder.

DETAILED DESCRIPTION

Figure 3:
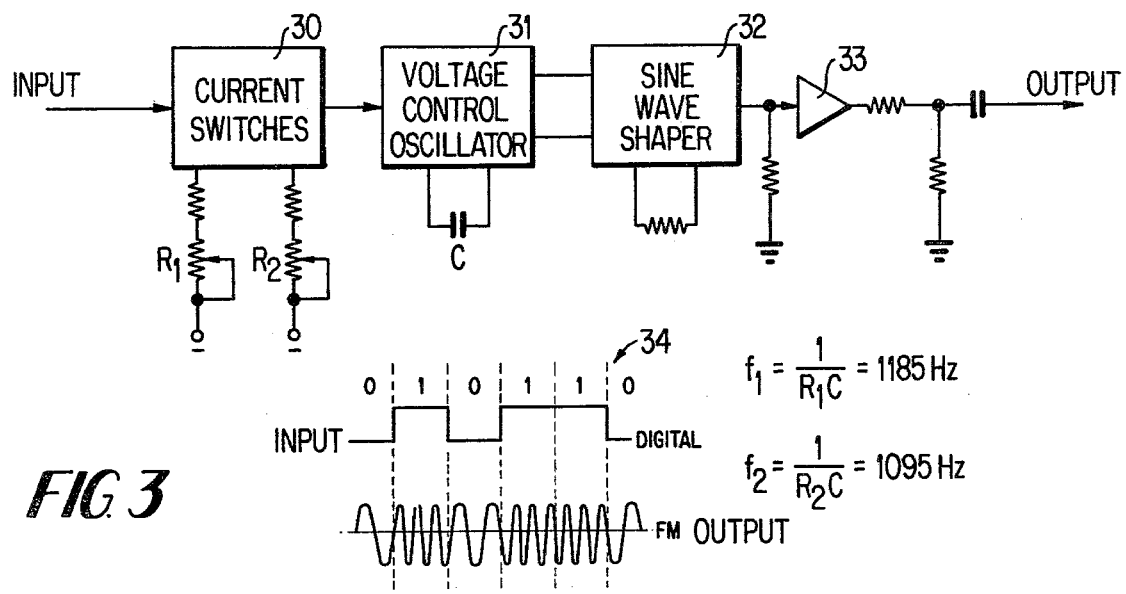
FIG. 3 is a diagram of a monolithic circuit of a Frequency-Shift-Keying-type (FSK) modulator, and the shape of the signals are shown on the input and output side in a separate diagram.

Referring to FIG. 1 the different units will now be described more in detail.

The different observation stations have each a coder marked $K_1$—$K_n$ in FIG. 1. The function and construction of the coders will be explained by help of FIG. 2. For transferring information (reporting) a special key set 20 is used consisting of 10 to about 60 keys. Every key has its own entry on an encoder 21.

By depression of a key the encoder gives an output consisting of a pulse train 22. The pulse train starts with a start pulse (1 bit) and ends with a stop pulse (2 bits). The space between the start and the stop pulses gets a bit pattern according to the depressed key that is the character, which shall be transmitted. The bit pattern from the encoder which can be described as a sequence of "1":s or "0":s is preferably following the ISO/R 646 (=USASC II) code. The time-length of the pulse train is defined by the rate generator 23, which normally is adjusted for a transferring frequency of 110 bits per second.

Figure 4:
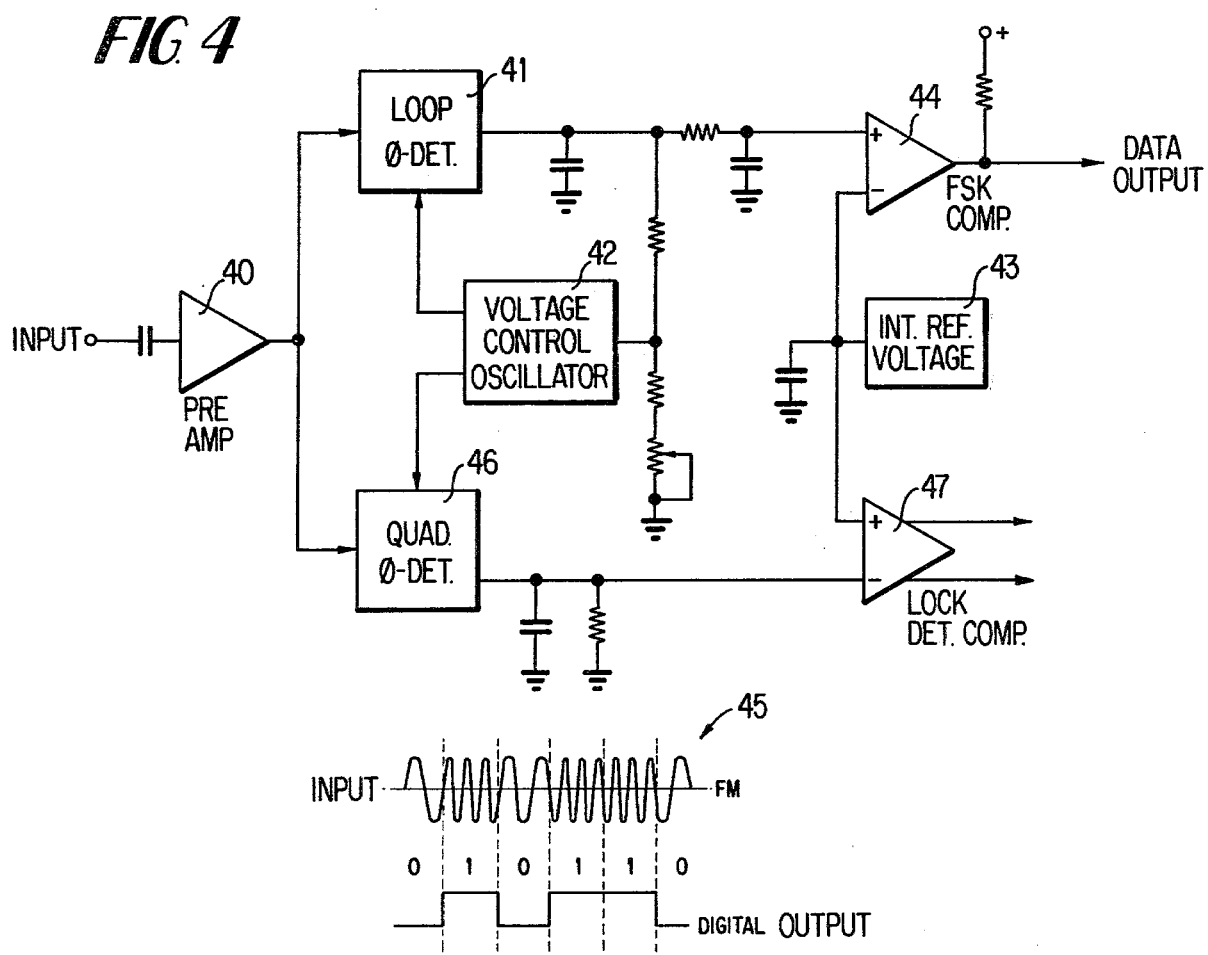
FIG. 4 is a diagram for a demodulator of FSK-type at the central station and shows, in a separate diagram, the shape of the signal on the input and output sides of the demodulator.

Every coder in FIG. 2 is connected to a modulator as shown in FIG. 3. In the block diagram in FIG. 1 the modulators are marked $m_1$—$m_n$. The modulator in FIG. 3 consists of a monolithic circuit of Frequency-Shift-Keying-type (FSK-type), which comprises current switches 30, giving current levels corresponding to "1" and "0", defined by external resistances. The gained voltages are brought to a voltage control oscillator 31, which will shift between two frequencies, 1185 Hz and 1095 Hz for "1" and "0" respectively. A sine wave shaper 32 improves the shape of the signal, which via a matching circuit 33 now as output can be fed to the speech input circuit of a radio transmitter. The waveform at the input respectively output side of the modulator is shown with help of the signal diagram 34, FIG. 3. The radio system, which according to FIG. 1 uses a number of transmitters $S_1$—$S_n$ corresponding to the number of receivers $M_1$—$M_n$, is based on conventional radio communication technics. Every channel has its own frequency, $f_1$—$f_n$. The reports in digital form by means of the key set and the coder can be affected without setting the speech communication out of function. To prevent a receiver at the central station from being switched over to transmitting position when reports are transmitted, a red lamp in each channel lights as long as there is an incoming carrier wave from the observation station. The output of every receiver $M_1$—$M_n$ is connected to a demodulator $d_1$—$d_n$ as is shown in the block diagram, FIG. 1. FIG. 4 shows the construction of a demodulator of FSK-type, which corresponds to the modulator on the transmitter side but has a reversed function. The demodulator is based on a monolithic phase-locked loop system. This comprises a preamplifier 40, a loop phase-detector 41 and a voltage control oscillator 42. The input signal to the preamplifier 40, shifting between two frequencies, will be controlled by the voltage control oscillator 42, which gets its control voltage from the loop phase-detector 41. The control voltage corresponds to "1" or "0". By help of an internal reference voltage 43 and a FSK-comparator 44 and "1" and "0" will be locked to fixed voltage levels and in this way generating a data output signal. The signal diagram 45 illustrates the wave shape at the input respectively output of the demodulator. A quadrature phase-detector 46 and a lock detector comparator 47 belongs to the system for giving eventually necessary synchronizing signals to the data output pulse train.

Each demodulator is on the output side connected to its own interface, $g_1$—$g_n$, FIG. 1. The interfaces are included in a control unit, FIG. 5, consisting of a number of boards, functionally connected by a micro-processor in chip-form (Motorola). To the control unit, FIG. 5, can 10 demodulators be connected via an equally number of interface boards 50, which also are designated as Asynchronous Communications Interface Adapters or ACIA. The 10 ACIA boards will each accomplish a series-parallel-transforming with adaption to the bit-frequency, 110 bits/sec, which is applied in the transmission part of the system. An ACIA-board 51, in FIG. 1 $G_2$, constitutes interface to the terminal, printer or display, in FIG. 1 denoted U, which shall present the reports from the observation stations. This ACIA-board accomplishes a parallel-series-transforming with adaption to a considerably higher bit-frequency, up to 9 600 bits/sec, depending on the capacity of the presentation device.

Figure 5:
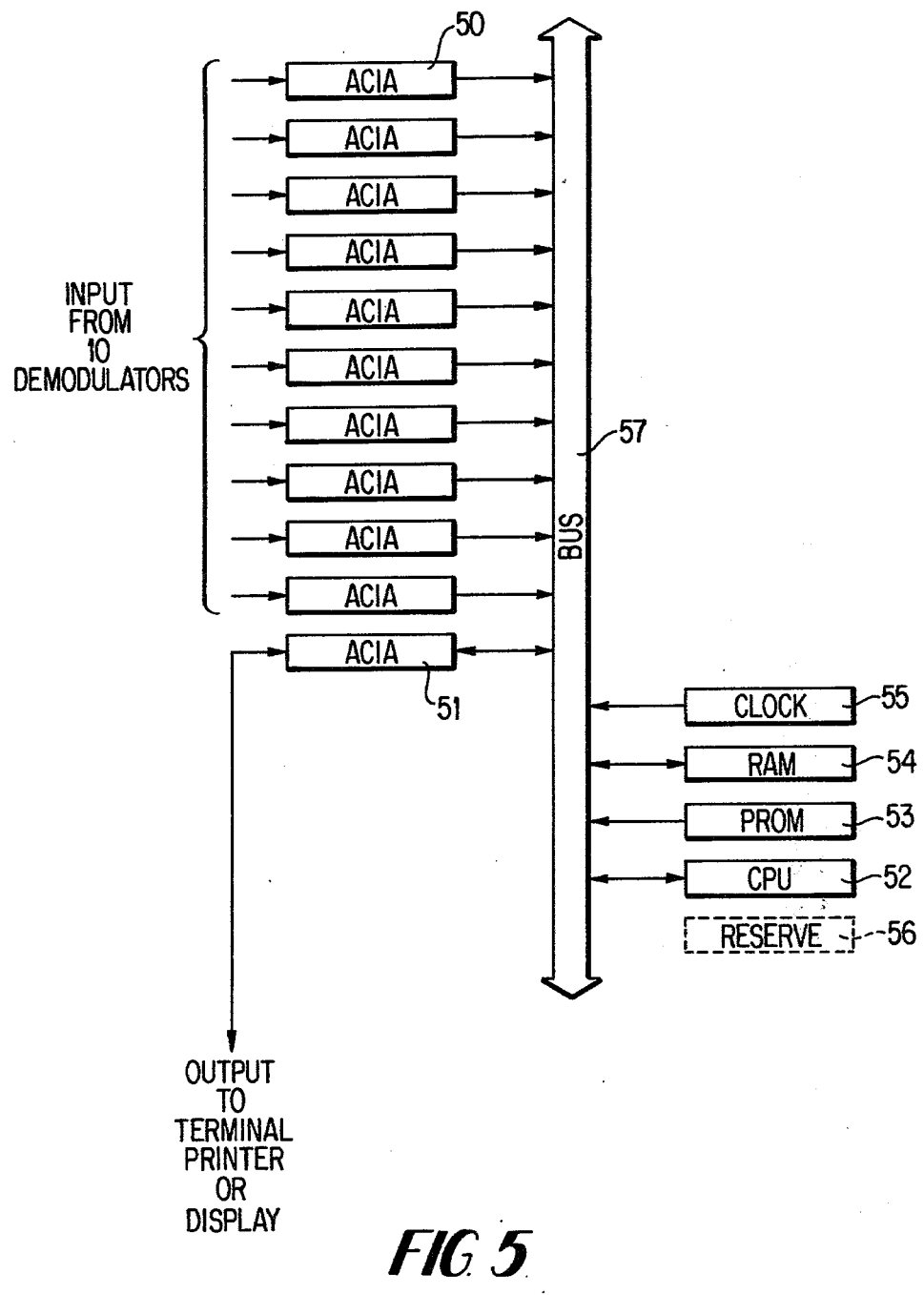
FIG. 5 is a diagram showing the general connections between a bus and the demodulators, the presentation device and the controlling set, the latter consisting essentially of a micro-processor, a program memory, a data memory and a clock.

The control unit is controlled by a micro-processor MP, FIG. 1, connected to a time-transmitter TG, activating the micro-processor during operation. In FIG. 5 the micro-processor is represented by the CPU-board 52 (CPU=Central Processing Unit). The program for controlling, the program memory PM, FIG. 1, is permanent and indestructible stored on a PROM-board 53, FIG. 5 (PROM=Programmable Read Only Memory). Temporary storing of incoming data, data memory DM, FIG. 1, is done in the control unit by help of a RAM-board 54, FIG. 5 (RAM=Randon Access Memory). The time-giving unit T in FIG. 1 consists of a clockboard 55 giving time pulses every second with power frequency as reference. Space is reserved for a board 56, in FIG. 1 $G_1$, by help of which the control unit can be connected together with an ordinary computer D in FIG. 1. All board-units are connected with a bus 57 transferring address-data and control signals between the units.

The control unit functions as a buffer against the coded reports from the observation stations. The reports are completed with information about the origin of the code signals, which appears from the address, every ACIA-board has been labelled with, and by help of the clock-board, the arrival time. The unit transfers thereafter the information to the presentation device. For this purpose a stored program amounting to 2 k-bytes in PROM is necessary.

The invention is not limited to the described embodiment but a great number of modifications and variations thereof are possible within the scope of the appended claims.

What we claim is:

1. A system for transmission of reports, comprising:

a plurality of observation stations, each including coder means including a key set for selecting code signs corresponding to the observations, among a predetermined set of code signs, defining at least one of height, distance, type and result of fire, and character of target, each kind of observation concerning different occurrences or events comprising several of said signs, and transmitter means for transmitting the code signs in a wireless way from each observation station by way of mutually separated channels having different wavelengths; and a central station including, for each channel, receiver means for receiving said transmitted code signs, demodulator means for generating pulse trains corresponding to the received code signs, bus means for receiving said pulse trains generated by said receiver means, and including a plurality of adapters of the asynchronous communications interference type for accomplishing a series-parallel transformation of said pulse trains at a given rate, a common adapter connected between the bus means and a presentation device, said common adapter performing parallel-series transformations at a considerably higher rate compared to said given rate of said series-parallel transformations of said plurality of adapters, clock means connected to said bus means for generating clock signals defining arrival times of said pulse trains after transformation, said common adapter transferring information completed with information about their origin derived from the plurality of adapters, and arrival times derived from the clock means, microprocessor means for controlling the transferring of the completed information to the presentation device, and two memories connected to the bus, one memory for holding a program which is permanent and indestructible, and the other memory comprising a temporary storage device for storing incoming data reports presented together to the presentation device.

2. A system as claimed in claim 1, said coder means comprising an encoder and a rate generator connected thereto, wherein each labelled key in the key set has its own entry on said encoder for generating in pulse train with a pattern according to the depressed key and with a bit-frequency defined by said rate generator.

3. A system as claimed in claim 2, further comprising a control signalling unit for each sign connected to said coder means and said transmitter means so as to indicate that the correct code sign has been transmitted.

4. A system as claimed in any one of claims 2 or 3, wherein the coder means is connected to a modulator of frequency-shift-keying type, said modulator comprising current switches giving current levels corresponding to "1" and "0", respectively, which in turn correspond to respective voltages, a voltage control oscillator responsive to said respective voltages for shifting between two frequencies corresponding to "1" and "0", respectively, to produce output signals, and a matching circuit and a sine wave shaper, wherein said matching circuit provides said output signals via said sine wave shaper as an output of the modulator, said output of said modulator being fed to a speech input circuit of a radio transmitter.

5. A system as claimed in claim 4, wherein the demodulator of frequency-shift-keying type is based on a phase-locked loop system, wherein the input signal is, via a pre-amplifier, shifting between two frequencies, controlled by a voltage control oscillator connected to obtain its control voltage from a loop phase detector, the control voltage corresponding to "1" or "0", respectively, and including an internal reference voltage and a frequency-shift-keying comparator for locking the control voltage to fixed voltage levels for generating a data output signal.

6. A system as claimed in claim 5, including a quadrature phase-detector connected to the preamplifier, and the voltage control oscillator being also connected to a lock detector comparator in order to generate synchronizing signals to the data-output pulse-train.

* * * * *